Sept. 3, 1940.  W. W. PAGET  2,213,259

VALVE MECHANISM

Filed Jan. 5, 1937 4 Sheets-Sheet 1

Inventor:
Wm. W. Paget.
by Luis D. Maxson.
Atty.

Sept. 3, 1940.  W. W. PAGET  2,213,259
VALVE MECHANISM
Filed Jan. 5, 1937  4 Sheets-Sheet 2
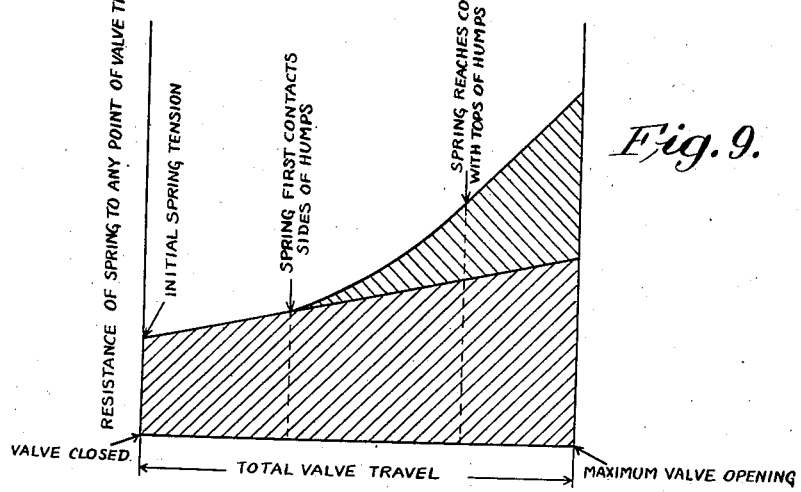
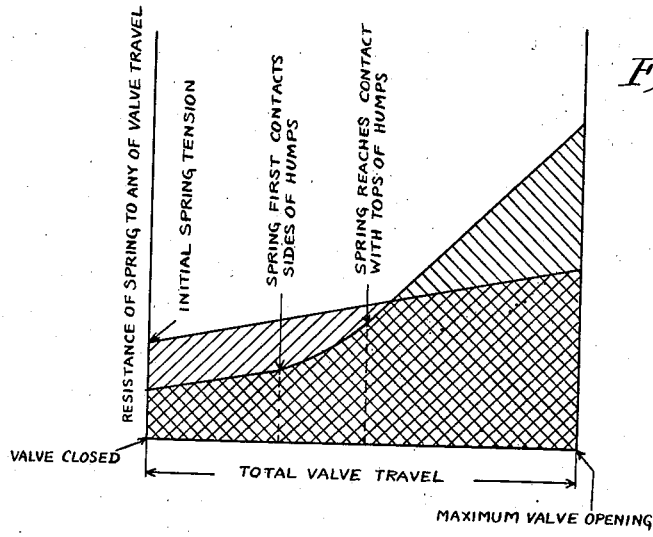

Sept. 3, 1940.    W. W. PAGET    2,213,259
VALVE MECHANISM
Filed Jan. 5, 1937    4 Sheets-Sheet 3

Inventor:
Wm W. Paget.
by
Louis A. Maxson,
atty.

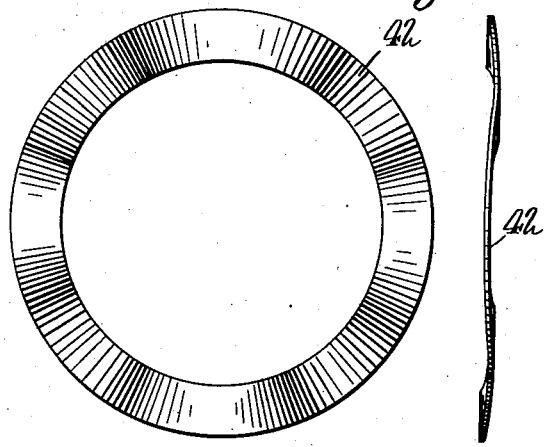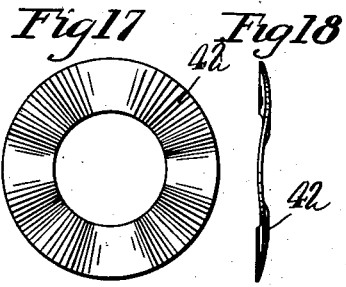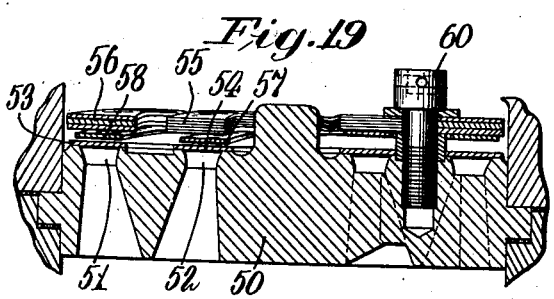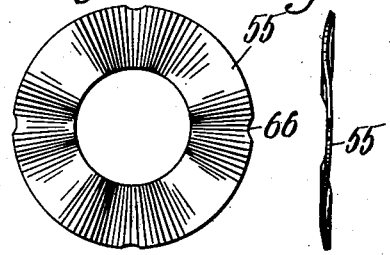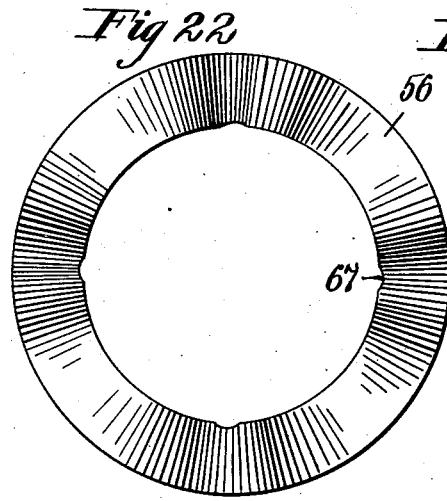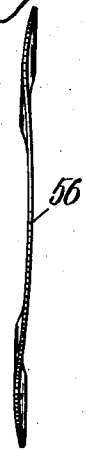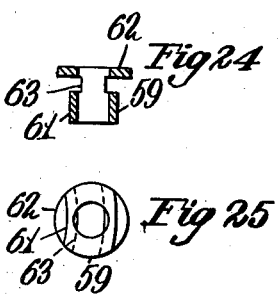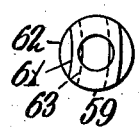

Patented Sept. 3, 1940

2,213,259

UNITED STATES PATENT OFFICE 2,213,259

VALVE MECHANISM

Win W. Paget, Michigan City, Ind., assignor to Sullivan Machinery Company, a corporation of Massachusetts Application January 5, 1937, Serial No. 119,128

27 Claims. (Cl. 251—119)

My invention relates to valve mechanisms, and more particularly to valve mechanisms for pumps, air compressors and the like.

It is important, particularly for pumps for gaseous fluids, that valve mechanisms be made as simple as possible, automatic in operation, durable, requiring a minimum pressure differential to effect their unseating, and yet adequately cushioned to minimize breakage. It is also important that they be constructed of as inexpensive parts as possible and provide ample flow areas.

When a conventional plane guard is used in conjunction with a bowed spring, whether of the strip or ribbon type or of the transversely-flexed annular type, with the convex side of the spring engaging the guard, the contact of the valve spring with the guard is substantially central both of the guard and of the spring, and with such devices the unsupported length or extension of the spring is much the same throughout the major portion of the valve movement. Hooke's law (within the elastic limit of the material, the stress is proportional to the strain) therefore indicates that the deflection of the spring as the valve opens is proportional to and is a substantially constant function of the deforming force. This rule may not apply strictly in the case of an annular valve spring, but fundamentally it is applicable to such a valve spring, when merely transversely bowed, and it is applicable quite closely and definitely to flexed strip or ribbon springs. Moreover, the deflection of the spring is substantially a straight line function with respect to the force applied. Now, if it be possible to provide a progressive shortening of the free arms, so-to-speak, of the spring as the valve opens, it will be evident that there will be an increasing rate of resistance to valve movement as the valve opens. As applied to a spring contacting adjacent its free ends with the valve and adjacent its center with a guard, the provision of such an arrangement will result in the attainment either of a like total resistance to opening movement of the valve with a smaller initial force required to unseat the valve, or in a higher total cushioning effect, if the valve lift be kept the same, so that higher pressures can be handled with the same valve lift and valve spring element.

When the guard is formed in such manner that, as the valve opens, at first there will be no substantial spread of contact between spring and guard, then a period of spreading contact between spring and guard towards the free end of the spring for a succeeding portion of the opening movement of the valve, and thereafter no further increase in the area of contact, but instead a lifting of the center of the spring out of contact with the guard, there will be provided a resistance to opening movement of the valve which will initially be the same as in the case of a spring engaging a plane guard; this will be followed by a period of increasing ratio of unit resistance to unit movement; and finally this will be succeeded by another period of substantially constant but higher unit resistance to unit movement ratio.

Now with a wave type valve guard, that is with a valve guard which is scalloped as it were, whether scalloped longitudinally of a straight guard, or circumferentially in the case of an annular guard, the result just discussed may be obtained, provided the waving of the guard is suitably determined with respect to the flexure of the spring. Specifically, the action will be similar for the first portion of the opening movement of the valve to the conditions which would prevail if the guard were plane. In other words, the deflection or flattening of the spring will be approximately a straight-line function of the resistance to valve opening. However, as soon as the spring flattens sufficiently to touch the sloping sides of the guard wave on either side of the original bottom contact point, increasing areas of contact are created between the spring and the sloping side of the guard wave. These increasing areas of contact connote decreasing lengths subject to free flexure, and as continued compression of the spring results in the contacts moving outward along the slope of the guard wave the resistance to opening movement of the valve will increase until contact is finally established between the spring and the tops of the humps of the guard. Thereafter, in all probability, although the precise time will depend upon the form of the guard wave and upon the difference in curvature between the valve spring and the guard, the valve spring will lift entirely out of its original contact with the guard at the bottom of the guard wave. To make this certainly clear, we may summarize by stating that with a two-complete-wave spring and a four-complete-wave guard, there will originally be diametrically opposite contacts between the spring and the guard, these contacts being along radial lines. As the spring is compressed by the opening valve, the area and the arcuate extent of the contacts between the spring and guard will increase until finally there will be approximately 90° zones of contact between the guard and spring diametrically opposite each other, and this will be followed by a lifting of the diametrically opposite points in the spring out of contact with the surface of the guard midway between the two waves along whose adjacent sides there is spreading contact as the spring flattens. After the spring lifts out of contact between the crests of the guard waves or after contact has spread completely to the crests of the waves, as described, a straight-line-function relation between valve deflection and resistance to deflection will again exist, but this ratio will be materially higher—possibly twice as high—as the same ratio during the initial unseating movement of the valve element.

The effect of the wave-type construction of the guard is therefore to shorten, during the latter part of the valve stroke, the distance between the point in the edge of the spring where the force is being applied and the point where support or reaction is being provided by the guard. There is, accordingly, a substantial increase in the resistance to deflection offered by the valve spring. In short, a much greater cushioning effect is obtained when needed, during the later part of the valve stroke.

These results may be obtained with rigid scalloped or waved guards, but they are also obtainable, and attainable most advantageously, from valve guards made of comparatively thin resilient material capable of offering a substantial cushioning effect by reason of their own spring action. This effect may be apparent only when the momentum of the valve on its opening stroke is too great to be overcome by the resistance of the valve spring per se; that is, when the valve and spring strike the guard as a unit, as sometimes occurs when the spring may be a little weak for the pressures encountered.

It will be evident that many different arrangements are possible employing the principles which have been considered. To mention a few, there may be provided a strip or ribbon valve, a bowed strip-spring, and a purely longitudinally extending waved guard. By varying the location of the waves and their height with respect to the point of initial contact between the spring and guard, it will be obvious that widely differing results may be obtained, including widely differing maxima in unit resistance to valve opening. The guards may be rigid, made of a single lamina of flexible material, or made of a plurality of superimposed laminae. With annular valves and waved springs, different wavings may be used, as for example, there may be a two-to-one ratio in the number of waves upon the guard to the number of waves in the spring, commencing with a two-wave spring and a four-wave guard, up to several times these numbers. For example, guards with ten waves and springs with five waves have been found entirely satisfactory. The principle of operation is, of course, the same essentially, regardless of the total number of humps or waves in the guards, so long as the guards have twice as many humps or waves as have the springs. However, as above noted, it is also possible to space the humps in the guard unequally, as illustrated in the drawings later referred to, and obtain desirable results. Of course, with stiff valves, the waving may be milled, say, upon the back of the valve, a plane guard used, and, with spring inverted if necessary, similar results are obtainable. The wave forms of course, too, are widely variable.

Another phase of my invention not previously considered resides in the provision of various modes of supporting resilient type guards, it being possible to support these at a plurality of points about their inner periphery, at a plurality of points about their outer periphery, by plane surfaces, or by series of coaxial plane surfaces in a common plane or in different planes beneath the guard (assuming the guard to be at the top of a horizontal valve).

It will be understood that the features above discussed are not limited to annular springs, and an important feature of the phase of my invention which has heretofore been most fully discussed is that of changing the deflection-force curve rate of a valve spring by shortening the lever arm, by allowing the spring to roll back over a curved backing plate, either solid or resilient, or to engage projections on the guard as the valve opens. Crimping as well as waving is also satisfactory.

Now with this preliminary discussion, it will be evident that one of the objects of my invention is to provide an improved valve mechanism. Another object of my invention is to provide an improved valve mechanism having an improved guard construction. A further object of my invention is to provide an improved valve mechanism having an improved guard and spring construction. Still another object of my invention is to provide an improved valve mechanism having an improved spring and resilient guard construction. Yet another object of my invention is to provide an improved waved-type spring and guard construction for a valve mechanism. Other objects and advantages of my invention will hereinafter more fully appear.

In the accompanying drawings, in which for purposes of illustration certain diagrams and illustrative embodiments of my invention are depicted—

Fig. 7 is a developed line diagram of a wave-type spring and guard.

Fig. 8 is a developed line diagram of a wave-type spring with a different wave-type guard.

Fig. 9 is a diagram showing generally the effect of the substitution of a waved guard for a plane guard, with the wave crests closer to each other on the guard than on the spring.

Fig. 10 is a diagram showing diagrammatically the improved results obtained by the practice of one aspect of my invention.

Fig. 15 is a plan view of one of the outer guard elements of the mechanism of Fig. 12.

Fig. 16 is an edge view of the guard element shown in Fig. 15.

Fig. 17 is a plan view of one of the inner guard elements of the mechanism of Fig. 12.

Fig. 18 is an edge view of the guard element shown in Fig. 17.

Fig. 19 is a central section, on an enlarged scale, through the right-hand (discharge) valve mechanism of Fig. 11, the radial sections on intersecting planes.

Fig. 20 is a plan view of an inner guard element of Fig. 19.

Fig. 21 is an edge view of the guard element shown in Fig. 20.

Fig. 22 is a plan view of an outer guard element of Fig. 19.

Fig. 23 is an edge view of the guard element shown in Fig. 22.

Fig. 24 is an axial sectional view of a guard support and valve guide as used in the structure of Fig. 19.

Fig. 25 is an end view of the guard support and valve guide shown in Fig. 24.

Figure 1:
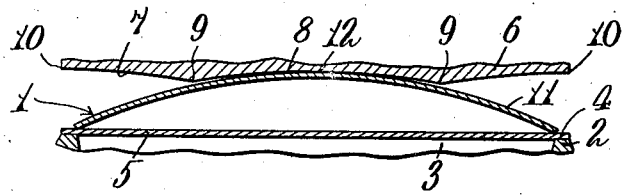
Fig. 1 is a fragmentary, somewhat diagrammatic longitudinal sectional view through a valve mechanism showing one aspect of my invention in a very simple form, as incorporated in a strip or ribbon type valve mechanism.
Figure 2:
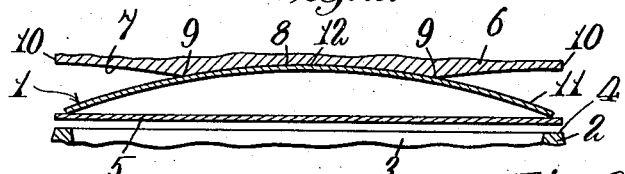
Fig. 2 is a similar view, showing parts in a different position.
Figure 3:
Fig. 3 is a similar view showing the parts in a still different position.

Referring first to Figs. 1 to 3, it will be noted that these figures show a valve mechanism employing what is known as a ribbon or strip valve, this very simple form of construction being selected in order that the basic principles may be considered with a minimum of complications.

The valve mechanism of these figures is generally designated 1 and comprises a seat or cage element 2 having a longitudinally extending port 3 therein. The plane upper surface 4 of said cage or seat element provides a valve seat with which a plane ribbon or strip-type valve 5 cooperates. This valve may desirably, for the purpose of this description, be regarded as, if not rigid, at least materially less flexible than its associated spring. Opposite the valve seat 4 is fixed a guard element 6, which is herein shown as of the rigid type, for simplicity of understanding. This guard element 6 has a surface 7 opposing the surface of the valve seat and comprising a central portion 8 formed on a curve of flatter curvature than the curvature of the valve spring which engages it. The surface 7 has, approximately halfway between its center and each of its ends, points of maximum projection 9, 9, which are, geometrically speaking, cuspel points, and the surface 7 recedes again from these points of maximum projection to the ends 10, 10 of the guard. A transversely bowed spring element 11 normally engages substantially only with line contact at the point 12, midway between the points 9, the surface 8 of the guard, and with its extremities engages the back of the valve element 5. Now, it will be noted that Fig. 1 shows the valve 5 seated and only approximately the line contact mentioned, at the point 12, between the spring and guard surface 8. As the valve 5 lifts from its seat, its upward movement will, at the very first, be opposed by a relatively light force. As its upward movement continues, the line contact at 12 will spread longitudinally of the guard into a surface contact, and said surface contact will steadily increase in length longitudinally of the guard until contact between the spring and the guard may extend for the full distance between the points 9, 9, the resistance to opening movement of the valve building up, at increasing rate, as the free length of the extremities of the valve spring not in contact with the guard surface diminishes. After contact as far as the points 9, 9 is established, further opening movement of the valve will result in a condition such as is shown in Fig. 3, in which the center of the valve spring may leave contact with the central portions of the surface 8 of the guard; and the resistance to valve movement will again be a relatively constant function of the distance it opens.

The operation of this illustrative embodiment of certain aspects of the invention may be summarized as follows: With the valve seated in the position of Fig. 1, the bowed spring 11 contacts with the surface 8 of the guard only midway between the ends of the latter. As the valve opens, it approaches and reaches the condition of Fig. 2, in which there is distinctly extended surface contact between the spring and guard. Between the positions of Figs. 1 and 2, the rate, so to speak, of resistance to valve movement increases as the valve opens. Between the position of Fig. 2 and that of Fig. 3, the valve moves with heightened rate of resistance to its opening movement but with the resistance per unit of movement, so to speak, more or less constant.

Now, it will be clear that such an arrangement provides a distinctly greater cushioning effect than would be secured from the same valve spring 11 if the latter were used with a plane guard at a distance equal to the distance between the point 12 and the plane of the valve seat 4 from said valve seat.

Figure 4:
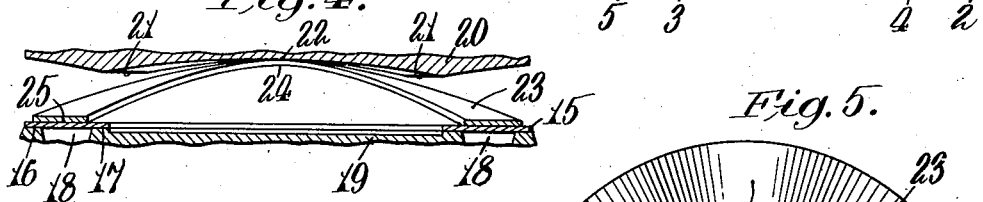
Fig. 4 is a fragmentary central sectional view through an annular-type valve mechanism.
Figure 5:
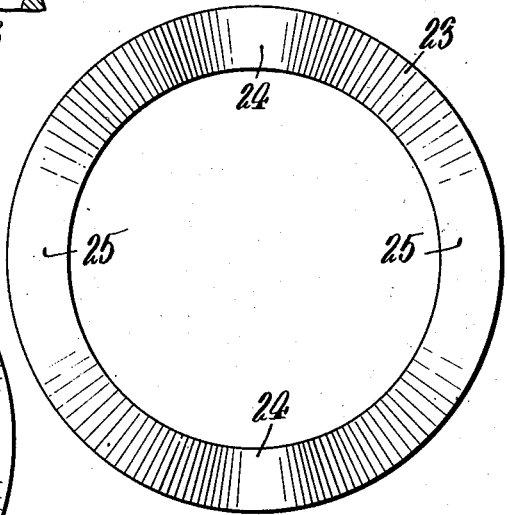
Fig. 5 is a plan view of the spring of Fig. 4.
Figure 6:
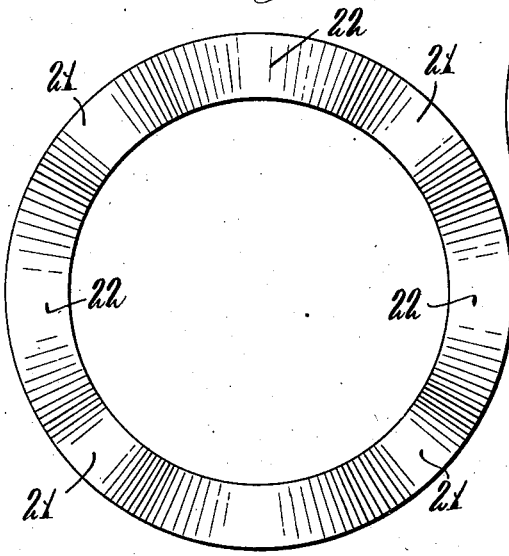
Fig. 6 is a face view of the guard of Fig. 4.

The same principle can be carried into annular or waved valves, and Figs. 4, 5 and 6 illustrate a construction in which an annular valve element 15 is employed. This valve 15 coacts with concentric seats 16 and 17 surrounding flow passages 18 in a valve seat or cage element 19. A guard 20, fixed in any suitable manner in spaced relation to the valve seats 16 and 17, is herein illustrated as providing four high spots, so to speak, 21, and four low spots 22; while the spring 23, which is shown as a waved spring, has a single pair of diametrically opposite high spots 24, and a single pair of intermediate low spots 25, also diametrically opposite to each other, separated by 90° from the high spots 24. When the spring is assembled, its high spots 24 will come opposite low spots 22 in the guard 20. Now, while the annular form of the spring and the guard will affect in some measure the phenomena occasioned by valve opening, it will be appreciated that as the valve opens, since the guard is formed with the high and low spots mentioned and since the surface of the guard will curve, desirably, more or less smoothly between said spots so as to provide a uniform wave form circumferentially of the valve: there will be at first a period of so-to-speak free action of the spring, followed by a period of increasing contact between spring and guard surfaces, and finally a period of flattening of the spring with the valve spring separating at its high spots 24 from the low spots 22 of the guard on which it previously rested; and the action of the spring during this last period will be one of offering a resistance to valve movement which will be more or less a straight line function of the extent of valve movement.

It will be clear that the valve and valve guard curvature may be made subject to a great deal of variation. For the purpose of showing the divergence of certain lines, the humps, as it were, upon the face of the guard have been made less pronounced in Figs. 1 to 4 than perhaps might be desirable for many embodiments of the invention.

In Fig. 7 there is shown a developed line view, as it were, showing a construction similar to that of Figs. 4, 5 and 6, with uniform waving of the guard surface 26, that is, with the crests and the hollows of the waves on the guard surface equally spaced completely around the periphery of the guard; and with the spring 27 likewise having its highest and lowest points equally spaced, but with only half as many waves in the complete circumference of the valve spring as there are in the guard. This arrangement is not, however, imperative, and, as shown in Fig. 8, the waves on the guard 28 may be unequally spaced, and there may be shorter waves 29s, for example opposite the portions of the spring which contact with the valve element, while the portions of the guard which contact with the spring in the closed position of the valve may be provided with waves 29¹ having longer troughs, as it were. Crimped or other flatter wave forms are satisfactory too.

The employment of more than two complete waves in the spring and four in the guard, with uniform spacing of wave crests, is obviously possible, and springs having five waves and guards having ten waves have been found to be entirely satisfactory.

The diagrams, Figs. 9 and 10, show generally, without effort at precise correctness of curve, the results possible with my improved form of guard and spring construction. The portion of Fig. 9 in which the section lines extend upwardly to the right, represents the operation of a given spring with a flat guard. It will be noted that the resistance of the spring varies directly with its deformation, and uniformly with its deformation, with the plane guard and an ordinary bowed spring. When, however, my improved guard construction is employed with the same spring, the changing rate of resistance to valve movement is clearly shown between the point marked "Spring first contacts sides of hump" and the point marked "Spring reaches contact with tops of humps"; and the relatively constant ratio of resistance to valve opening movement which results after this last point throughout the remaining portions of the lift of the valve, is clearly shown in the steepest portion of the graph. Obviously, the increased area represented by the leftwardly upwardly sloping section lines shows that a marked improvement in result is obtainable with my invention, and that a much more effective cushion can be obtained with an identical spring by the employment of my invention.

In Fig. 10 a modified diagram is shown, from which it will be evident that with a spring presenting an initially lower resistance to valve-opening movement, the same total cushioning effect can be obtained by the practice of the invention, the greater resistance during the later portions of the valve movement building up an adequate cushion effect, although the valve will open upon a less fluid pressure differential at its opposite sides than would be possible with the standard type spring and plane guard construction. This design is similarly marked and the points of change in spring and guard contact have been shown altered, in order that it may be appreciated the more clearly that radical differences in mode of valve control are possible by appropriately selecting spring and guard formation. It will be evident that the humps upon the spring might be formed in such a manner that the intermediate portion of the curve would be omitted, the spring passing directly from a condition in which halves of its length, for example, between crests or contacts with the valve flex, to a condition where a predetermined fraction of such length becomes the measure of the spring resistance.

In the foregoing analysis there has been considered only the case of rigid guard structures. Obviously, the same phases of the invention may be practised with valve guards possessing a certain degree of flexibility—a flexibility adequate to provide greater cushion than could be obtained without using initially unduly heavy springs or extreme valve lifts. The waved guard surface may be provided by means of appropriate resilient metallic stampings, these conforming generally in shape to the valve, being strip or ribbon-like when a strip or ribbon valve is used, and annular when an annular valve is used. One or more of these laminae may be employed, a plurality thereof being advantageous in providing for a greater combination of strength and resilience. Moreover, it is possible to support the laminae in distinctly different ways. Figs. 11 to 18 inclusive show one arrangement. Here it will be noted that a valve seat element 30 has coaxial series of ports 31 and 32 opening through coplanar seat surfaces 33 and 34. A rigid guard element 35, spaced by appropriate sleeve-like portions 36 from the surface of the cage element, is held in position by threaded members 37. The face of the guard element 35 toward the cage element 30 is provided with coaxial grooves 39 and 40 opposite the flow passages 31 and 32 respectively. Within the grooves there are seated flexible guard elements, herein in the outer groove, a pair of similarly waved laminae 41, these being held in positions coaxial with the valve seat 34 by the side walls of the groove 40; and in the inner groove 39 there are similarly positioned three laminae 42. Coaxial valve elements 43 and 44, annular in form, respectively control the flow of fluid through the ports 31 and 32, and annular, appropriately flexed valve springs 45 and 46 engage the inner surfaces of the inner laminae and the outer surfaces of the valve elements. Desirably, the springs will be formed with a distinctly different number of humps or waves from the number on the laminae, and a one-to-two ratio, in number of undulations, is desirable, as above indicated. The cylindrical portions 36 guide the outer spring 46 at its inner periphery, and the inner spring 45 at its outer periphery. The mode of operation of this mechanism need not be described in detail, as it will be evident how it works from what has been previously said with respect to other and simpler forms of the invention.

Figure 11:
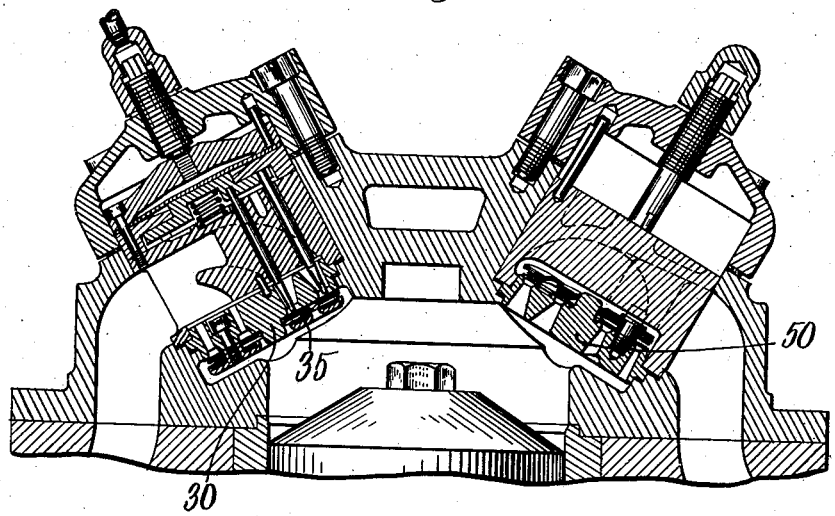
Fig. 11 is a central section through the head end of a compressor cylinder having valve mechanisms incorporated therein which embody certain aspects of my invention, said valve mechanisms shown in sections on angularly related planes.
Figure 12:
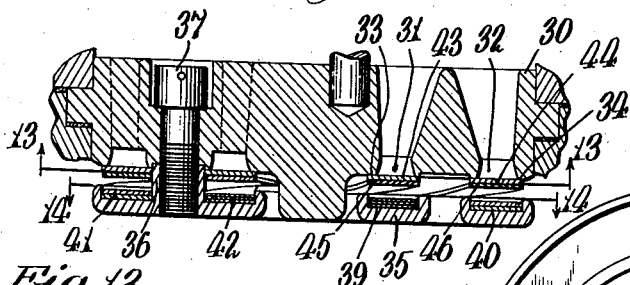
Fig. 12 is a central section, on an enlarged scale, through the left-hand (inlet) valve mechanism of Fig. 11.
Figure 14:
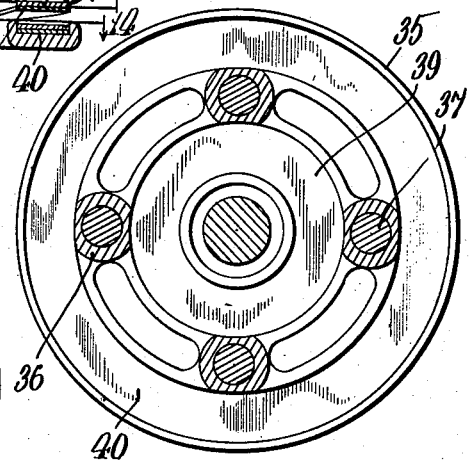
Fig. 14 is a section on the plane of the line 14—14 of Fig. 12.
Figure 13:
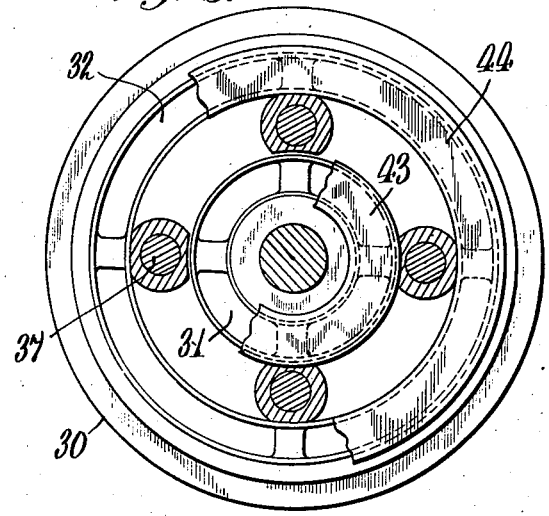
Fig. 13 is a sectional view, with parts broken away, on the plane of the line 13—13 of Fig. 12.

Figs. 19 to 25 inclusive show the construction illustrated at the right in Fig. 11. In this arrangement a valve cage element 50 is provided with coaxial series of flow passages 51 and 52, with which there cooperate annular valve elements 53 and 54 respectively. This form of the invention also includes laminated waved valve guards, and herein five laminae 55 are arranged opposite the flow passages 52, and three laminae 56 opposite the flow passages 51. Appropriately waved or curved valve springs 57 and 58 are arranged between the innermost lamina 55 and the valve element 54 and between the innermost lamina 56 and the valve element 53. The lamina are held in position with respect to each other and to the valve cage, in this form of construction, by elements 59, best shown in Figs. 24 and 25 and cooperating screws 60. These elements have cylindrical body portions 61 through which the shanks of the screws 60 extend, and flat heads 62, and they are laterally slotted, as at 63, to provide grooves to receive the bundles of laminae making up the inner and outer guard portions. The laminae are, as shown in Figs. 20 to 23 inclusive, appropriately notched, the inner laminae notched as at 66 on their outer peripheries, and the outer laminae notched as at 67 at their inner peripheries, so that rotation of the laminae may be prevented by interlocking with the shank of the screw 60. Here it will be observed that because of the free outer and inner edges of the outer and inner bundles of laminae, additional flexibility is possible. The mode of operation, in general, of this form of the invention will be evident from what has been previously said, and detailed description is again unnecessary, simply bearing in mind that the outer edges of the ply valve and spring may be guided by the inner sides of the elements 59, while the inner edges of the spring and valve associated with the outer flow ports 51 are guided by the outer surfaces of the elements 59.

From the foregoing description, it will be evident that I have provided an improved construction in which an improved mode of operation of pump valves is obtained; in which new and simplified constructions are embodied; in which lighter resistance to opening of the valves is presented and yet adequate cushioning secured; and in which a shock-absorber effect may be additionally superimposed upon the improved spring action, in a simple and effective manner.

While I have in this application specifically described four forms which my invention may assume in practice, it will be understood that these forms are shown for purposes of illustration, and that the invention may be modified and embodied in various other forms without departing from its spirit or the scope of the appended claims.

What I claim as new and desire to secure by Letters Patent is:

1. In a pump valve mechanism, a valve cage element providing a valve seat, a valve associated with said cage element for movement toward and away from said seat, an abutment rigidly spaced from the valve seat and presenting a waved surface towards said valve, and a waved spring disposed between said valve and abutment with the crest of a wave thereon engaging the trough of a wave on the abutment and with the wave on said spring being of substantially greater length than the wave on said abutment.

2. In a pump valve mechanism, a valve cage element providing a ported valve seat, a valve associated with said cage element for movement towards and away from said seat, an abutment presenting a waved surface towards said valve, and a waved spring disposed between said valve and abutment and having the crest of a wave thereon engaging the trough between two wave crests on the abutment and said spring engaging said valve at opposite sides of its engagement with said trough, the distance between said last mentioned wave crests less than the distance between said engagements of said spring with said valve.

3. In a pump valve mechanism, a valve cage element providing a valve seat, a valve associated with said cage element for movement toward and away from said seat, an abutment presenting a waved surface towards said valve, and a waved spring disposed between said valve and abutment with the crest of a wave thereon engaging the trough of a wave on the abutment, said spring having half the number of waves the abutment has.

4. In a pump valve mechanism, a valve-seat-providing element, a valve guard element, a valve element coacting with the valve seat, and a spring between said guard and valve elements contacting with one of the same at a place between its places of contact with the other, the element having said first mentioned place of contact having at each side of the latter portions projecting towards, and closer than said place of contact to, the other element and engageable by said spring upon predetermined valve opening and providing fulcra for modifying spring flexure during valve opening beyond said predetermined amount.

5. In a pump valve mechanism, an annular valve-seat-providing element, an annular valve guard element, an annular valve element coacting with the valve seat, and a flexed annular spring between the guard and valve elements contacting at alternate portions with each of the same, one of said elements presenting a waved surface having cuspal points projecting towards the other, which are nearer to said other than is the contact between said first element and said spring when the valve is closed and which cuspal points are out of contact with the spring when the valve is closed but between which and said spring contact is effected upon partial valve opening.

6. In a pump valve mechanism, a valve-seat-providing element, a valve guard element, a valve element coacting with the valve seat, and a bowed spring between said guard and valve elements having its extremities contacting with one of the same and its central portion with the other of the same, the element contacted by the central portion of said spring presenting a curved abutment surface having cuspal points at each side of the point of such contact closer to the element contacted by the extremities of the spring than is its portion contacted by said spring.

7. In combination, a plane valve seat, a plane valve engaging said seat, a valve spring for effecting closure of said valve, and a guard maintaining said spring under initial compression, said guard and valve spring each waved, the waves of said valve spring of greater depth than and less in number than the waves of said guard and said valve spring and guard so related that a plane parallel to the plane of the valve cutting the waves of the guard also cuts the spring.

8. In a pump valve mechanism, a valve cage element providing a valve seat, a valve associated with said cage element for movement toward and away from said seat, a resilient waved abutment for said valve and a spring loosely disposed between said valve and abutment and yieldingly pressing the same apart and having a different number of waves from said abutment and said valve spring and abutment so related that when said valve engages said valve seat a plane parallel to the plane of the valve cutting the waves of the abutment also cuts the spring.

9. In combination, a plane valve seat, a plane valve element engaging said seat, a valve spring element for effecting closure of said valve element, and a guard element maintaining said spring element under initial compression, said guard and spring elements respectively presenting waved contours, said spring element having one-half the number of waves found on said guard element and said valve spring and guard elements so related that a plane parallel to the plane of the valve element cutting the waves of the guard element also cuts the spring element.

10. In combination, a plane valve seat, a valve element having a plane surface engaging said seat, a valve spring element superimposed upon said valve element, and a guard element maintaining said spring element under initial compression, said spring element and at least one of the elements which it engages presenting waved contours, with the number of waves on one of the waved elements a plurality of times greater than the number on the remainder and said elements having waved contours both cut by a common plane parallel to the plane seat-engaging surface on said valve element.

11. In a pump valve mechanism, a valve cage element providing a circular valve seat, an annular valve associated with said cage element for movement toward and away from said seat, an annular guard for said valve presenting a circumferentially waved abutment surface facing said seat, and a resilient annular waved spring between said abutment surface and valve having one-half the number of waves presented by said abutment surface and said valve spring and guard so related that on engagement of said valve seat by said valve a plane parallel to the the plane of the valve cutting the waves of the guard also cuts the spring.

12. In a spring and guard mechanism, in combination, a circumferentially waved spring, a spring guard presenting a circumferentially waved surface for engagement by said spring, said surface having a plurality of waves thereon for each wave of the spring with which the same is intended to be employed and with the troughs between the waves on said guard having a flatter curvature than the waves of the spring.

13. In combination, a cage element providing a valve seat, a plane valve cooperating with said seat, a flexed spring superimposed upon said valve, and a guard fixed in spaced relation to said seat and having a waved surface contacted by said spring between the crests of the waves thereon and with which said valve forces said spring into a relation of maximum area of contact subsequent to initial but substantially prior to the maximum bodily opening of said valve.

14. In combination, a cage element providing a valve seat, a plane valve cooperating with said seat, a flexed spring superimposed upon said valve, and a guard fixed in spaced relation to said seat and contacted by said flexed spring and having a surface contacted by said spring with which said valve forces said spring into a relation of maximum area of contact subsequent to initial but substantially prior to the maximum opening of said valve and with which surface spring-contact-area then diminishes on further valve opening movement.

15. In combination, a valve seat, a plane valve cooperating with said valve seat, a waved spring superimposed upon said valve, and a guard fixed in spaced relation to said seat and contacting initially with each wave of said spring substantially only with line contact and presenting a surface into contact with which said spring moves increasingly during the initial portion of the valve opening movement but without further spread of contact on continued valve opening movement after said valve has attained a predetermined partially open position though the portions of said valve engaged by said spring continue to move away from said valve seat as said valve continues its opening movement.

16. In combination, a valve seat, a plane valve cooperating with said valve seat, a flexed spring engaging said valve, and a guard fixed in spaced relation to said seat and contacting initially with said spring substantially only with line contact and presenting a surface into contact with which said spring moves increasingly during the initial portion of the valve opening movement but spring contact with which decreases on continued valve opening movement after said valve has attained a predetermined partially open position.

17. In a pump mechanism, a valve seat, a spaced guard backing element rigidly spaced from said seat and providing a groove facing said seat, a valve associated with said seat, a circumferentially waved spring engaging said valve, and a separate circumferentially waved resilient guard element in said groove and contacted by said spring.

18. In a spring and guard mechanism, in combination, a waved spring, a guard for said waved spring presenting a circumferentially waved surface for engagement by said spring, said surface having a plurality of waves thereon for each wave of the spring with which the same is intended to be employed and providing surfaces in its troughs for initial spring engagement.

19. In combination, a valve seat, a plane valve cooperating with said seat, a flexed spring engaging said valve, a guard fixed in spaced relation to said seat and initially contacted by said spring substantially only in line-type contact, said guard presenting a surface into contact with which said valve forces said spring with a maximum area of contact subsequent to initial but substantially prior to maximum opening of said valve, said contact area decreasing on continued valve opening movement to substantially line-type contact when said valve attains its maximum open position.

20. In combination, a valve seat, a plane valve cooperating with said seat, a flexed spring engaging said valve, a guard fixed in spaced relation to said seat and initially contacted by said spring substantially only in line contact, said guard presenting a surface into contact with which said valve forces said spring with increasing area of contact as said valve moves from a closed to a partially open position, said contact area decreasing on valve opening movement beyond said partially open position to line contacts at points evenly spaced from points in said first line of contact when said valve attains its maximum open position.

21. In a pump valve mechanism, a valve-seat-providing element, a valve guard element, a valve element coacting with the valve seat, and a spring between said guard and valve elements contacting with said valve element at a place between its places of contact with said guard element, said guard element having portions projecting towards said valve element at points spaced between the places of spring contact with said guard element and out of contact with the spring when the valve element is closed but between which and said spring contact is effected, upon partial valve opening, to increase the resistance to flexure of said spring as valve opening continues.

22. In a valve mechanism, a member providing a valve seat, an abutment member spaced from said valve seat, a valve cooperating with said valve seat and movable on opening movement thereof towards said abutment member, a flexed spring interposed between said valve and abutment member for yieldingly holding said valve on its seat, and projecting means carried by said abutment member and ineffective during initial valve opening movement and contacted by said valve spring at spaced points on the latter when said valve is moved away from its seat a predetermined amount, for multiplying the rate of increase in resistance to flexure of said spring as valve opening movement continues.

23. In a pump valve mechanism, a valve-seat-providing element, a valve guard element, a valve element coacting with the valve seat, and a spring between said guard and valve elements contacting with one of the same at a place between its places of contact with the other, one of said elements contacted by said spring having portions projecting towards the other element and engageable by said spring upon predetermined valve opening movement and providing abutments for modifying spring flexure during valve opening movement beyond said predetermined amount.

24. In a pump valve mechanism, means providing a valve seat, a valve guard element, a valve element coacting with said valve seat, and a spring element between said guard and valve elements contacting with one of the same between its places of contact with the other, one of said elements having projecting portions engageable with another of said elements when said value is partially opened to cause a modified flexure of said spring, said projecting portions each disposed between a contact of the spring element with the valve element and an adjacent contact of the spring element with the guard element.

25. In a valve mechanism, a member providing a valve seat, a valve cooperating with said valve seat, a valve guard, and a spring between said valve and guard and contacting said valve at a place between its places of contact with said guard, said guard having between its contacts with said spring abutment means projecting towards said valve beyond a straight line connecting the places of spring contact with the guard and engageable by said spring on valve opening movement for modifying spring flexure.

26. In a pump valve mechanism, a valve cage element providing a valve seat, a valve associated with said cage element for movement towards and away from said seat, an abutment rigidly spaced from the valve seat and presenting a waved surface towards said valve, and a waved spring disposed between said valve and abutment with the opposite ends of a wave thereon engaging troughs of waves on the abutment and with the waves on said spring of substantially greater length than the waves on said abutment whereby a plurality of wave crests on said abutment lie between the opposite ends of the wave on said spring.

27. In a pump valve mechanism, a valve cage element providing a plane valve seat, a valve element coacting with said valve seat, and means for yieldably urging said valve element towards said valve seat including a waved valve spring element and a waved reaction plate element, with a plurality of times as many waves on one of the waved elements as upon the other element, and said spring and plate elements being so related that a plane parallel to the valve seat cutting the waves of the plate element also cuts the spring element.

WIN W. PAGET.